(12) United States Patent
Takahashi et al.

(10) Patent No.: US 10,969,570 B2
(45) Date of Patent: Apr. 6, 2021

(54) IMAGE ACQUISITION DEVICE AND IMAGE ACQUISITION METHOD

(71) Applicant: HAMAMATSU PHOTONICS K.K., Hamamatsu (JP)

(72) Inventors: Akira Takahashi, Hamamatsu (JP); Yasumoto Suzuki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/487,157

(22) PCT Filed: Mar. 12, 2018

(86) PCT No.: PCT/JP2018/009449
§ 371 (c)(1),
(2) Date: Aug. 20, 2019

(87) PCT Pub. No.: WO2018/190053
PCT Pub. Date: Oct. 18, 2018

(65) Prior Publication Data
US 2019/0369379 A1 Dec. 5, 2019

(30) Foreign Application Priority Data
Apr. 13, 2017 (JP) .............................. JP2017-079672

(51) Int. Cl.
*G02B 21/34* (2006.01)
*B01L 9/00* (2006.01)
(Continued)

(52) U.S. Cl.
CPC ................ *G02B 21/34* (2013.01); *B01L 9/52* (2013.01); *G01N 1/28* (2013.01); *G01N 35/04* (2013.01);
(Continued)

(58) Field of Classification Search
CPC ..... G01B 11/16; G01B 11/0608; G01N 21/88; G01N 35/00732; H01L 21/67383;
(Continued)

(56) References Cited

U.S. PATENT DOCUMENTS 6,208,909 B1\* 3/2001 Kato ................. H01L 21/67265
414/331.14
10,094,951 B2\* 10/2018 Togashi .................... G01V 8/12
(Continued)

FOREIGN PATENT DOCUMENTS

JP 2005-500522 A 1/2005
JP 2007-303930 A 11/2007
(Continued)

OTHER PUBLICATIONS

International Preliminary Report on Patentability (IPRP) dated Oct. 17, 2019 that issued in WO Patent Application No. PCT/JP2018/009449.
(Continued)

*Primary Examiner* — Hoa Q Pham
(74) *Attorney, Agent, or Firm* — Faegre Drinker Biddle & Reath LLP

(57) ABSTRACT

An image acquisition device is an image acquisition device for acquiring an image of samples held on slide glasses and includes a cassette mounting unit in which a cassette is detachably mounted, the cassette holding the slide glasses in a plurality of stages in a predetermined arrangement direction, a distance sensor that measures a distance to the cassette mounted in the cassette mounting unit and outputs a detection signal based on a measurement result, and an information generation unit that generates state information on a mounting state of the cassette mounted in the cassette mounting unit on the basis of the detection signal.

9 Claims, 9 Drawing Sheets

(51) Int. Cl.
*G01N 1/28* (2006.01)
*G01N 35/04* (2006.01)

(52) U.S. Cl.
CPC . *B01L 2200/025* (2013.01); *B01L 2300/0841* (2013.01)

(58) Field of Classification Search
CPC .......... H01L 21/6732; H01L 21/67326; H01L 21/67346; G01V 8/20; G02B 21/34; G02B 21/365; G06K 7/1417; G06K 7/1413
USPC ...... 356/601–623, 237.1–237.5; 414/331.14, 414/331.18, 937
See application file for complete search history.

(56) References Cited

U.S. PATENT DOCUMENTS

| | | | | |
|---|---|---|---|---|
| 2003/0130761 | A1* | 7/2003 | Schauer | ............ H01L 21/67265 |
| | | | | 700/213 |
| 2005/0241517 | A1* | 11/2005 | Trilk | ........................ B65H 1/26 |
| | | | | 101/477 |
| 2008/0240613 | A1* | 10/2008 | Dietz | .................. G02B 21/367 |
| | | | | 382/284 |
| 2009/0197520 | A1* | 8/2009 | Hayashi | ................... B65G 1/00 |
| | | | | 454/256 |
| 2014/0178169 | A1 | 6/2014 | Hebert et al. | |
| 2020/0011889 | A1* | 1/2020 | Toyoda | ................... B01L 3/545 |
| 2020/0057293 | A1* | 2/2020 | Shibata | ................... G02B 21/34 |

FOREIGN PATENT DOCUMENTS

| | | | |
|---|---|---|---|
| JP | 2010-500616 | A | 1/2010 |
| JP | 2011-227192 | A | 11/2011 |
| JP | 2013-127578 | A | 6/2013 |
| JP | 2014-526712 | A | 10/2014 |
| KR | 2005070378 | A * | 7/2005 |
| KR | 1020030099834 | * | 7/2005 |
| KR | 2010-0111432 | A | 10/2010 |
| WO | WO 02/014877 | A2 | 2/2002 |
| WO | WO-03/008103 | A1 | 1/2003 |
| WO | WO-2006/098442 | A1 | 9/2006 |
| WO | WO-2008/019311 | A2 | 2/2008 |
| WO | WO-2013/034430 | A1 | 3/2013 |

OTHER PUBLICATIONS

"Leica Biosystems: Aperio AT2", http://www.bairesac.com/uploads/leica-aperio-at2.pdf, Aug. 22, 2012, XP055749604.

* cited by examiner

IMAGE ACQUISITION DEVICE AND IMAGE ACQUISITION METHOD

TECHNICAL FIELD

The present disclosure relates to an image acquisition device and an image acquisition method that are used for acquisition of an image of a sample or the like.

BACKGROUND ART

An example of this type of image acquisition device includes an image acquisition device described in Patent Literature 1. This image acquisition device includes a macro image acquisition device that acquires a macro image of a sample, and a micro image acquisition device that acquires a micro image of the sample. The macro image acquisition device acquires a macro image of a sample on a slide glass, and sets scan conditions (a scan range, focus acquisition information, and the like) for acquiring a micro image on the basis of the acquired macro image. The micro image acquisition device includes an objective lens with a high magnification according to the scan conditions set on the basis of the macro image. The micro image acquisition device acquires a high magnification (high resolution) image of the sample on the slide glass using the high magnification objective lens.

Further, an example of a device that conveys a plurality of slide glasses to the image acquisition device as described above includes a slide glass conveyance device of Patent Literature 2. The slide glass conveyance device includes a removal device that removes a slide glass from a cassette holding the slide glasses in a plurality of stages and transfers the slide glass to a predetermined position. The slide glass conveyance device includes a removal hand that includes a protrusion engaged with the slide glass, a driving mechanism that performs operations such as advancing, retracting, and raising of the removal hand, and a positioning guide that is provided at an advancing position of the slide glass.

CITATION LIST

Patent Literature

[Patent Literature 1] Japanese Unexamined Patent Publication No. 2013-127578
[Patent Literature 2] WO 2006/098442 Pamphlet

SUMMARY OF INVENTION

Technical Problem

The slide glass conveyance device as described above is useful in that the slide glass conveyance device conveys a large number of slide glasses to an image acquisition device so that the image acquisition device can continuously execute image acquisition of the sample. However, it can be conceived that a mounting state of the cassette may not stable when the cassette is mounted in the image acquisition device. There is concern that the device may fail when the image acquisition device is driven in a state in which the cassette is not correctly mounted in the image acquisition device.

The present disclosure has been made to solve the above problems, and an object of the present disclosure is to provide an image acquisition device and an image acquisition method capable of ascertaining a mounting state of a cassette in advance.

Solution to Problem

An image acquisition device according to an aspect of the present disclosure is an image acquisition device for acquiring an image of samples held on slide glasses, the image acquisition device including: a cassette mounting unit in which a cassette is detachably mounted, the cassette holding the slide glasses in a plurality of stages in a predetermined arrangement direction; a distance sensor that measures a distance to the cassette mounted in the cassette mounting unit and outputs a detection signal based on a measurement result; and an information generation unit that generates state information on a mounting state of the cassette mounted in the cassette mounting unit on the basis of the detection signal.

In the image acquisition device, the distance to the cassette mounted in the cassette mounting unit is measured using the distance sensor. When the cassette is not mounted in the cassette mounting unit normally, a measurement result of the distance to the cassette in the distance sensor fluctuates with respect to a normal value. Therefore, it is possible to generate state information on the mounting state of the cassette by analyzing the detection signal from the distance sensor. By ascertaining the state information in advance, it is possible to prevent the image acquisition from being executed in a state in which the cassette is not correctly mounted, and to prevent failure of the device in advance.

Further, the cassette mounting unit may include an insertion and removal opening into or from which the cassette is inserted or removed, and a back opening located on the side opposite to the insertion and removal opening, and the distance sensor may be a reflective distance sensor that measures a distance to a back surface portion of the cassette through the back opening. With such a configuration, the mounting of the cassette and the detection of the mounting state can be realized with a simple configuration.

Further, the cassette may include a partition plate that partitions the slide glasses in the arrangement direction, and the distance sensor may measure a distance to the partition plate. In this case, the detection of the mounting state of the cassette can be performed accurately.

Further, the cassette mounting unit may include a rotation drum having a plurality of holding spaces for the cassettes radially, and the image acquisition device may further include an operation control unit that controls an operation of the rotation drum on the basis of the state information generated by the information generation unit. In this case, by controlling the operation of the rotation drum, it is possible to more reliably prevent image acquisition from being executed in a state in which the cassette is not correctly mounted.

Further, the cassette mounting unit may include a strut through which the rotation drum is inserted, and the distance sensor may be provided in the strut via a support member. In this case, the distance sensor can be used in common for different cassettes held in the rotation drum.

Further, a metal member may be provided on a back surface of the cassette, and the cassette mounting unit may include a magnet to be coupled to the metal member. Accordingly, the cassette can be mounted in the cassette mounting unit with a simple configuration.

The image acquisition device may further include a display unit that displays a mounting state of the cassette on the basis of the state information generated by the information generation unit. Accordingly, a user of the image acquisition device can immediately ascertain the mounting state of the cassette.

Further, an image acquisition method according to an aspect of the present disclosure is an image acquisition method for acquiring an image of samples held on slide glasses, the image acquisition method including: a mounting step of mounting a cassette in a cassette mounting unit, the cassette holding the slide glasses in a plurality of stages in a predetermined arrangement direction; a measurement step of measuring a distance to the cassette mounted in the cassette mounting unit using a distance sensor, and a generation step of generating state information on a mounting state of the cassette mounted in the cassette mounting unit on the basis of a detection signal from the distance sensor.

In the image acquisition method, the distance to the cassette mounted in the cassette mounting unit is measured using the distance sensor. When the cassette is not mounted in the cassette mounting unit normally, a measurement result of the distance to the cassette in the distance sensor fluctuates with respect to a normal value. Therefore, it is possible to generate state information on the mounting state of the cassette by analyzing the detection signal from the distance sensor. By ascertaining the state information in advance, it is possible to prevent the image acquisition from being executed in a state in which the cassette is not correctly mounted, and to prevent failure of the device in advance.

Further, the cassette mounting unit may include an insertion and removal opening into or from which the cassette is inserted or removed, and a back opening located on the side opposite to the insertion and removal opening, and the measurement step may include measuring a distance to a back surface portion of the cassette through the back opening using the distance sensor. With such a configuration, the mounting of the cassette and the detection of the mounting state can be realized with a simple configuration.

Further, the cassette may include a partition plate that partitions the slide glasses in the arrangement direction, and the measurement step may include measuring a distance to the partition plate using the distance sensor. In this case, the detection of the mounting state of the cassette can be performed accurately.

Further, the cassette mounting unit may include a rotation drum having a plurality of holding spaces for the cassettes radially, and the image acquisition method may further include a control step of controlling an operation of the rotation drum on the basis of the state information. In this case, by controlling the operation of the rotation drum, it is possible to more reliably prevent the image acquisition device from being driven in a state in which the cassette is not correctly mounted in the image acquisition device.

Further, the image acquisition method may further include a display step of displaying a mounting state of the cassette on the basis of the state information. Accordingly, a user of the image acquisition device can immediately ascertain the mounting state of the cassette.

Advantageous Effects of Invention

According to the present disclosure, it is possible to ascertain a mounting state of the cassette in advance.

DESCRIPTION OF EMBODIMENTS

Hereinafter, preferred embodiments of an image acquisition device and an image acquisition method according to an aspect of the present disclosure will be described in detail with reference to the drawings.

Figure 1:
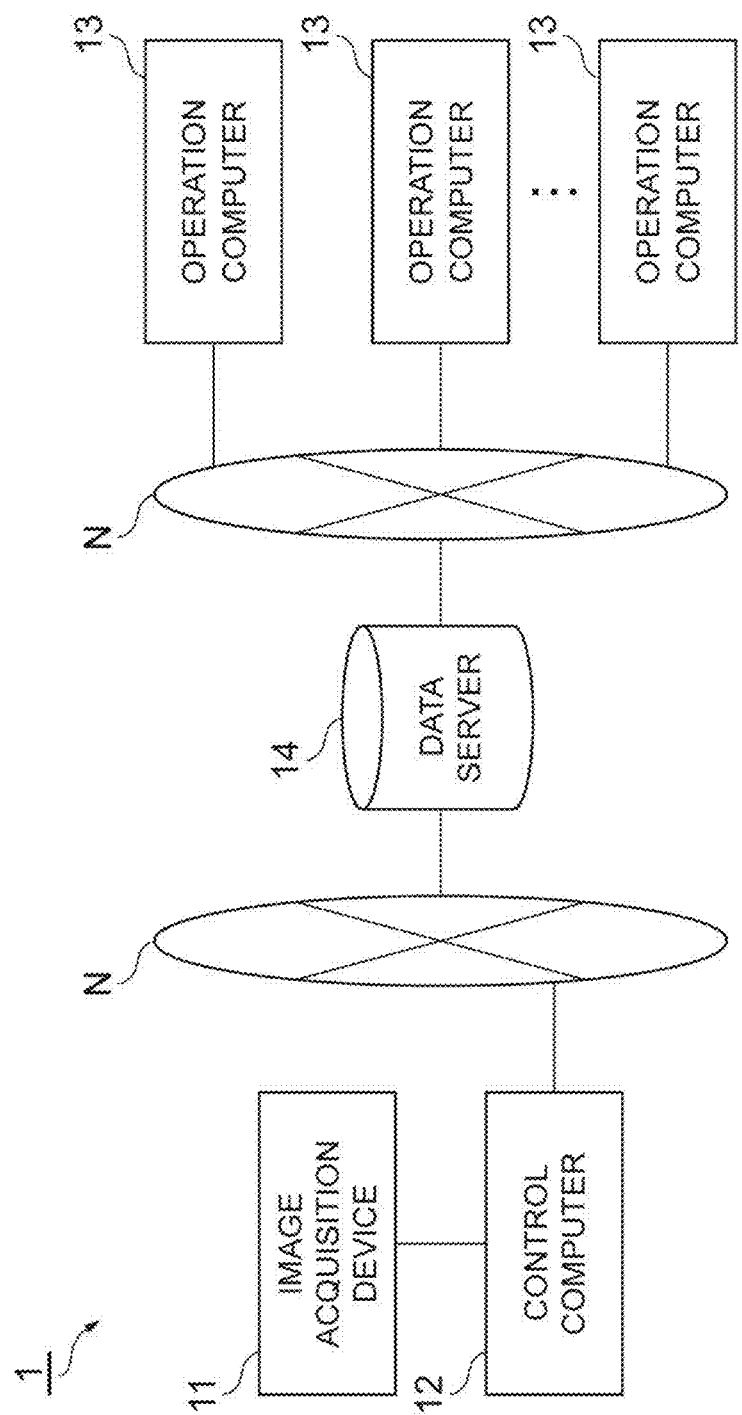
FIG. 1 is a system configuration diagram illustrating an example of an image acquisition system including an image acquisition device.

FIG. 1 is a system configuration diagram illustrating an example of an image acquisition system including an image acquisition device. As illustrated in FIG. 1, an image acquisition system 1 includes an image acquisition device 11, a control computer 12 that controls an operation of the image acquisition device 11, a plurality of operation computers 13 that is used for operation of the image acquisition device 11, and a data server 14 that stores various pieces of data that is used in the image acquisition system 1. The image acquisition system 1 is a system in which the image acquisition device 11 is remotely operated using operation computers 13 at different installation places, a virtual slide image of a sample such as a biological sample is acquired by the image acquisition device 11, and observation of the sample based on the virtual slide image can be performed at various facilities.

The control computer 12 and the operation computers 13 are physically a computer system that includes a memory such as a RAM and a ROM, and a processor (an arithmetic circuit) such as a CPU. The control computer 12 and the operation computer 13 are, for example, a personal computer, a smart device, a microcomputer, or a cloud server. Further, a display device such as a display, an input device such as a keyboard and a mouse, and the like are connected to the control computer 12 and the operation computer 13. Further, the display device and the input device may be a touch screen or a smart device.

The image acquisition device 11 and the control computer 12 are installed, for example, in the same room in a facility and are connected by a cable or wirelessly so that the image acquisition device 11 and the control computer 12 can communicate information with each other. The data server 14 is installed, for example, in a data center different from the facility in which the image acquisition device 11 and the control computer 12 are installed, and is connected to the control computer 12 via the network N so that the data server 14 can communicate information with the control computer 12. The operation computer 13 is installed, for example, in an arbitrary facility, and is connected to the data server 14 via the network N so that the operation computer 13 can communicate information with the data server 14. It should be noted that the image acquisition device 11 and the control computer 12 may be installed in separate facilities or separate rooms. Further, the data server 14 may be installed in the same facility as the control computer 12.

The control computer 12 and the operation computer 13 receive an input such as a scan condition of a sample in the image acquisition device 11 from a user, and controls an operation of the image acquisition device 11 on the basis of the input condition. Further, the control computer 12 transmits various pieces of data such as image data acquired by the image acquisition device 11 to the data server 14. The control computer 12 and the operation computer 13 have a browsing function of displaying a virtual slide image acquired by the image acquisition device 11 on a display by referring to various pieces of data stored in the data server 14.

Figure 2:
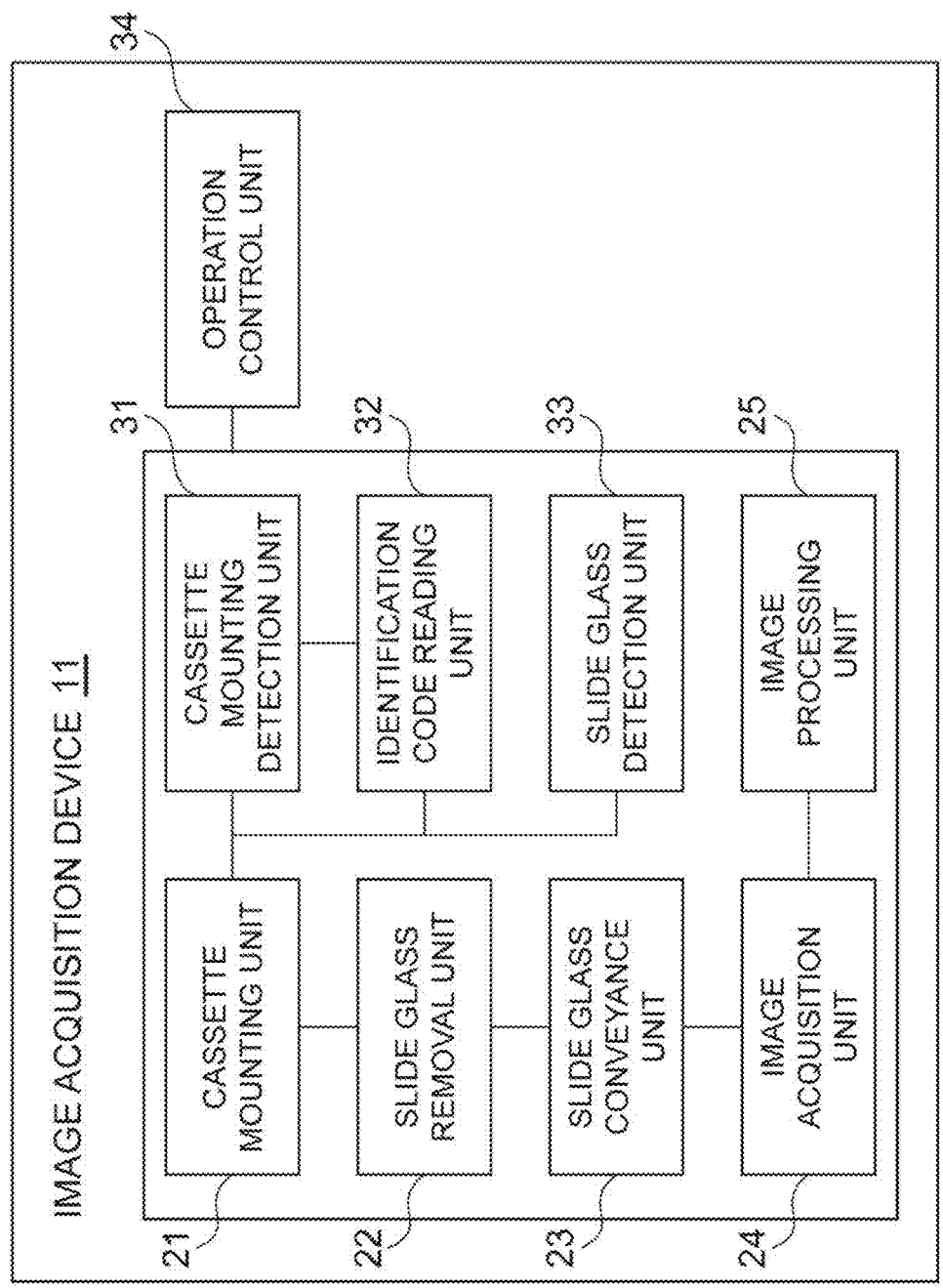
FIG. 2 is a block diagram illustrating an embodiment of the image acquisition device.

Next, the image acquisition device 11 will be described. FIG. 2 is a block diagram illustrating an embodiment of an image acquisition device. As illustrated in FIG. 2, the image acquisition device 11 includes a cassette mounting unit 21, a slide glass removal unit 22, a slide glass conveyance unit 23, an image acquisition unit 24, and an image processing unit 25. Further, for the cassette mounting unit 21, a cassette mounting detection unit 31, an identification code reading unit 32, and a slide glass detection unit 33 are provided. Further, the image acquisition device 11 further includes an operation control unit 34 that controls an operation of each of these components on the basis of control from the control computer 12 or the operation computer 13.

Figure 3:
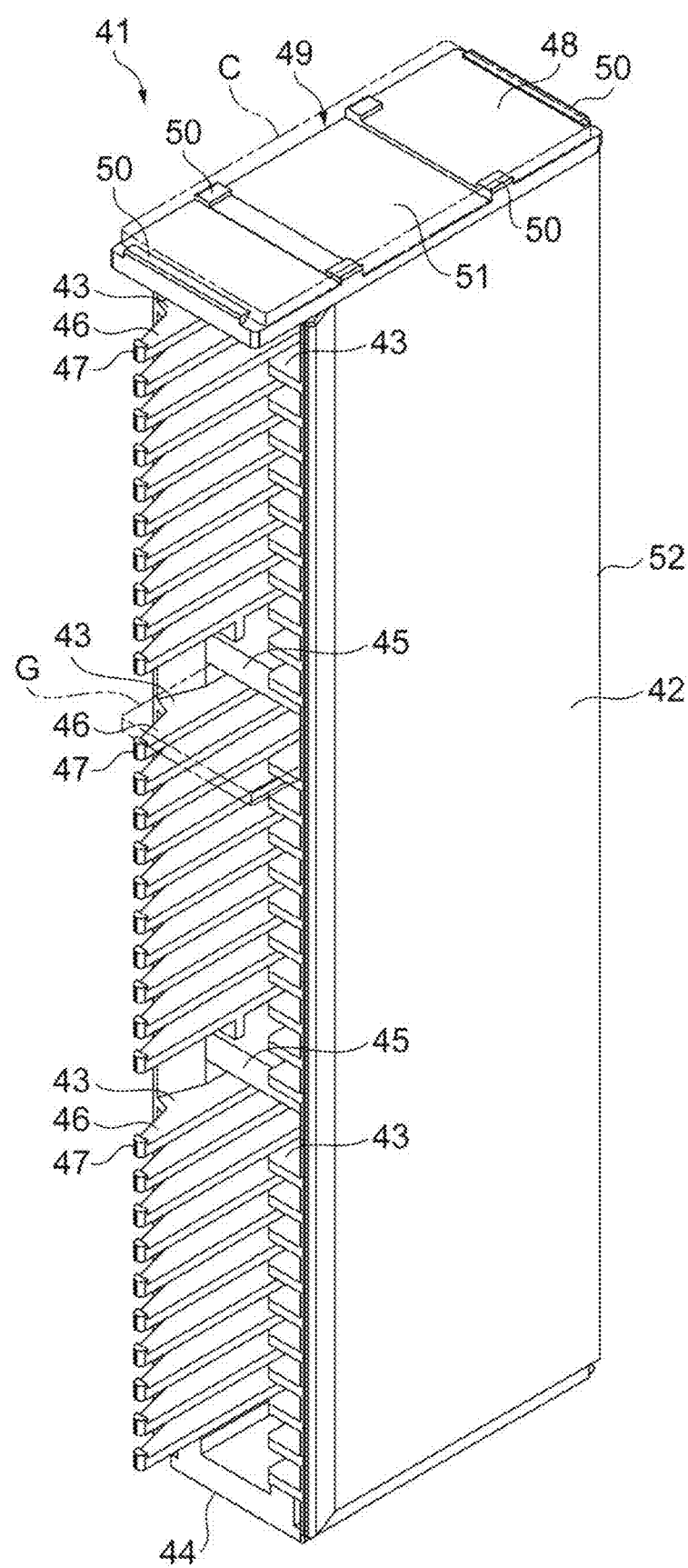
FIG. 3 is a perspective view illustrating an example of a cassette that holds a slide glass from the front surface side.
Figure 4:
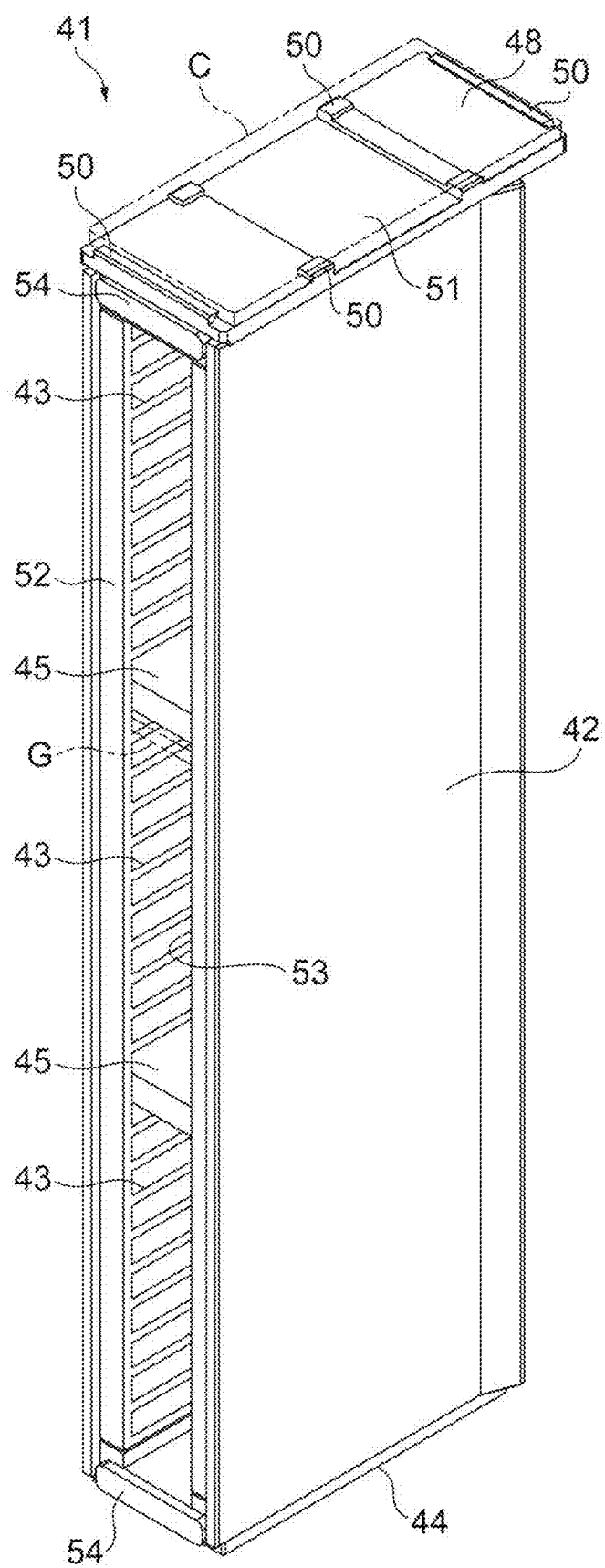
FIG. 4 is a perspective view illustrating the cassette illustrated in FIG. 3 from the back surface side.

The cassette mounting unit 21 is a cassette holder in which a cassette 41 holding a plurality of slide glasses is detachably mounted. As illustrated in FIGS. 3 and 4, the cassette 41 includes a casing 42 made of a resin having a vertically long, substantially rectangular parallelepiped shape. Holding plates 43 and 43 that overhang toward the inner side of the casing 42 are provided on a pair of inner side walls of the casing 42, respectively. By placing the slide glass G on the holding plates 43 and 43, the slide glass G is held in parallel with a bottom surface 44 of the casing 42.

In the cassette 41 of the embodiment, 30 stages of holding plates 43 and 43 are provided in a height direction of the cassette 41, and 30 slide glasses G can he held at one time. Further, in the embodiment, a partition plate 45 is disposed every 10 stages, and a holding interval of the slide glasses G in a disposition position of the partition plate 45 is wider than other positions. Accordingly, the holding position of the slide glass G can be visually ascertained with ease.

One holding plate 43 and the other holding plate 43 are spaced from each other at a central portion of the casing 42. Further, the one holding plate 43 includes a projection portion 46 that projects to the front surface side of the casing 42, and a claw portion 47 that is provided at the tip of the projection portion 46. A width of the projection portion 46 is narrowed toward the front surface side of the casing 42, and the claw portion 47 is provided upwardly at the tip of the tapered projection portion 46. With such a configuration, in a state in which the slide glass G is mounted on the holding plates 43 and 43, a bottom surface of the slide glass G (particularly, the vicinity of a corner portion) is exposed from the holding plates 43 and 43 with a sufficient area. Therefore, the slide glass G can be easily removed from the holding plates 43 and 43 with a finger. Further, even when the cassette 41 is inclined, it is difficult for the slide glass G to fall.

A placement unit 49 in which an identification card C is placed is provided in a top surface 48 of the cassette 41. An identification code including identification information for identifying the cassette 41 as a character string is imparted to one surface side of the identification card C on the top surface. The identification code may be a bar code, or may be a two-dimensional code such as a QR code (registered trademark). The identification code may be directly printed on the identification card C, or a seal on which the identification code has been printed may be pasted. The placement unit 49 has a plurality of claws 50 provided at an edge of the top surface 48. Side surfaces of the identification card C placed in the placement unit 49 are held by the claws 50. Further, a recessed portion 51 is provided with a constant width over the entirety in a width direction of the top surface 48 in a central portion of the top surface 48. Since a central portion of the identification card C floats from the placement unit 49 due to the recessed portion 51, the identification card C can be easily removed from the placement unit 49 with a finger.

Further, as illustrated in FIG. 4, an opening portion 53 is provided at a central portion of a back surface 52 of the cassette 41. The opening portion 53 corresponds to a holding area of the slide glass G by the holding plates 43 and 43 and extends with a constant width in the height direction of the cassette 41. Therefore, in an area in which the opening portion 53 is provided, it is possible to see the back surface side of the cassette 41 from the front surface side through the opening portion 53. Further, on the back surface 52 of the cassette 41, metal plates (metal members) 54 that are used for mounting of the cassette 41 in the cassette mounting unit 21 are provided at positions below the opening portion 53 and above the opening portion 53, respectively. The metal plates 54 have, for example, a strip shape having a length substantially equal to a width of an internal space of the cassette 41 and is fixed to the casing 42 by a fastening means such as a screw.

Figure 5:
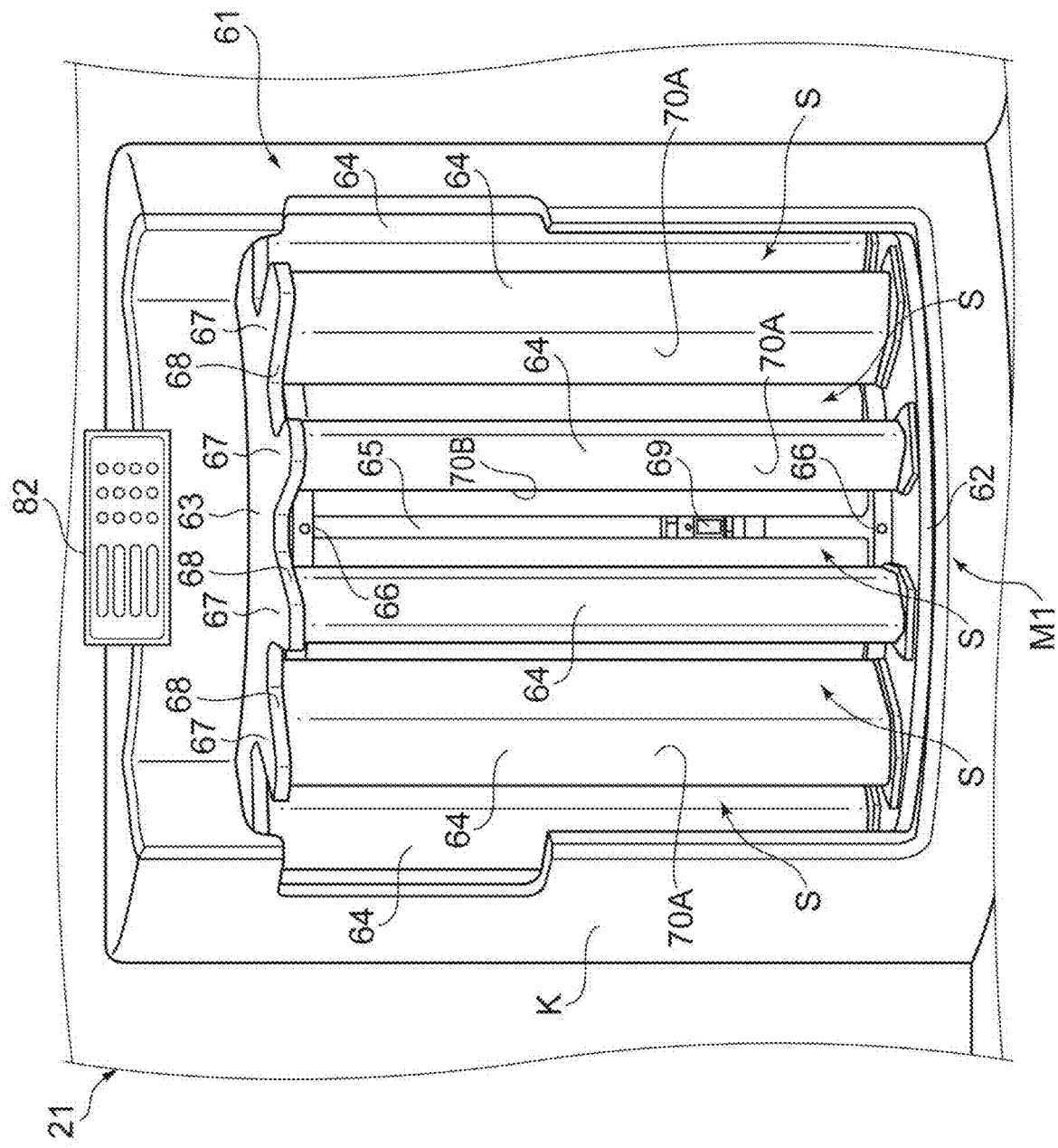
FIG. 5 is a front view illustrating an example of a cassette mounting unit.

FIG. 5 is a front view illustrating an example of the cassette mounting unit 21. As illustrated in FIG. 5, the cassette mounting unit 21 includes a rotation drum 61 in which a plurality of cassette 41 can be mounted, in a frame K. The rotation drum 61 includes a bottom plate 62, a top plate 63, and a plurality of cassette holding plates 64 disposed between the bottom plate 62 and the top plate 63. A strut 65 is provided at a central portion of the rotation drum 61. The strut 65 are passed through openings respectively provided in a central portion of the bottom plate 62 and a central portion of the top plate 63, and serves as a fixed shaft (a non-rotating shaft). The strut 65 may be either a cylinder or a prism.

The cassette holding plates 64 are radially disposed with a constant phase angle around a central axis of the rotation drum 61. A space between the adjacent cassette holding plates 64 and 64 serves as a holding space S of the cassette 41 described above. In the embodiment, twelve holding spaces S are provided in a circumferential direction of the rotation drum 61. Since the cassette holding plates 64 are radially disposed, the holding space S is narrowed toward the back side from the outer circumferential side of the rotation drum 61. Further, end portions of the adjacent cassette holding plates 64 are spaced at constant intervals on the back side of the holding space S. Accordingly, an insertion and removal opening 70A into or from which the cassette 41 is inserted or removed, and a back opening 70B located on the side opposite to the insertion and removal opening 70A with the holding space S interposed between the insertion and removal opening 70A and the back opening 70B are formed for each holding space S. A peripheral surface or a side surface of the strut 65 on a back side of the holding space S can be seen from the front surface side of the rotation drum 61 due to the insertion and removal opening 70A and the back opening 70B.

Magnets 66 are provided at positions on the back side of the holding spaces S on the bottom plate 62 and the top plate 63, respectively. By inserting the cassette 41 (see FIGS. 3 and 4) into the holding space S in a state in which the back surface side is directed to the back side, the upper and lower metal plates 54 on the back surface side of the cassette 41 are coupled to the upper and lower magnets 66 of the holding space S by a magnetic force. Thus, the cassette 41 is detachably held on the rotation drum 61. The magnet 66 may be provided on at least one of the bottom plate 62 and the top plate 63. In this case, a metal plate 54 may be provided on the back surface side of the cassette 41 to correspond to the position of the magnet 66.

An actuator that rotates the rotation drum 61 in one direction (for example, clockwise) around the central axis is provided at a portion under the bottom plate 62. In the rotation drum 61 of the embodiment, a mounting position M1 of the cassette 41 is set so that the cassette 41 is directed to the front surface side of the image acquisition device 11. In the example of FIG. 5, in the mounting position M1, three holding spaces S can be accessed from a window of the frame K, and three cassettes 41 can be mounted on the rotation drum 61 at one time. The cassettes 41 held in the holding space S are sequentially sent from the mounting position M1 to a detection position in which various detections are performed and a removal position in which the slide glass G in the cassette 41 is taken out and sent to the image acquisition unit 24, by rotation of the rotation drum 61.

Further, the top plate 63 includes a plurality of holding pieces 67 that extend radially from the center side and hold upper ends of the cassette holding plates 64. A notch portion 68 corresponding to a planar shape of the holding space S is provided between the holding pieces 67 and 67. The top surface 48 (that is, the placement unit 49 of the identification card C) of the cassette 41 held in the holding space S can be seen through the top plate 63 by the notch portion 68.

Referring back to FIG. 2, the cassette mounting detection unit 31 detects a mounting state of the cassette 41 on the rotation drum 61. The cassette mounting detection unit 31 includes, for example, a distance sensor 69 that detects a distance from the cassette 41 held in the holding space S to the strut 65, and determines whether or not the mounting state of the cassette 41 is good on the basis of a detection result of the distance sensor 69. More details of the cassette mounting detection unit 31 will be described below.

The identification code reading unit 32 reads the identification code imparted to the identification card C. The identification code reading unit 32 includes, for example, an identification code reader disposed above the rotation drum 61, and reads the identification code from the identification card C placed on the top surface of the cassette 41 sent to the detection position M2 by the rotation of the rotation drum 61. The identification code reading unit 32 outputs the identification information of the cassette 41 included in the read identification code to the image processing unit 25.

The slide glass detection unit 33 detects the holding position and/or the holding state of the slide glass G in the cassette 41. For example, the slide glass detection unit 33 includes a photoelectric sensor disposed outside the rotation drum 61, and detects the holding position and/or the holding state of the slide glass G in the cassette 41 sent to the detection position by the rotation of the rotation drum 61. The photoelectric sensor is also referred to as a beam sensor, a photoelectric sensor, or a laser sensor. The slide glass detection unit 33 outputs holding information indicating the detected holding position and/or holding state to the slide glass removal unit 22. The slide glass detection unit 33 may perform reporting using a reporting means when there is an abnormality in the detected holding position and/or holding state.

The slide glass removal unit 22 removes the slide glass G from the cassette 41 held by the rotation drum 61. The slide glass removal unit 22 includes a removal means such as a conveyance hand, and sequentially removes the slide glasses G from the cassette 41 sent to the removal position M3 by the rotation of the rotation drum 61 and delivers the slide glasses G to the slide glass conveyance unit 23. Further, the slide glass removal unit 22 receives the slide glasses G for which the image acquisition of the image acquisition unit 24 has been completed from the slide glass conveyance unit 23 and causes the slide glasses G to return to original holding positions in the cassette 41.

Driving of the conveyance hand by the slide glass removal unit 22 is controlled on the basis of the holding information that is output from the slide glass detection unit 33. For example, the slide glass removal unit 22 may extract only the slide glass G of which the holding position and/or the holding state has been detected as being normal using the conveyance hand, and skip the extraction of the slide glass G of which the holding position and/or the holding state has been detected as being abnormal.

The slide glass conveyance unit 23 conveys the slide glass G received from the slide glass removal unit 22 toward the image acquisition unit 24. Further, the slide glass conveyance unit 23 conveys the slide glass G between a macro image acquisition position and a micro image acquisition position of the image acquisition unit 24. The slide glass conveyance unit 23 delivers the slide glass G for which the image acquisition unit 24 has completed image acquisition, to the slide glass removal unit 22.

The image acquisition unit 24 images a sample held on the slide glass G and acquires an image of the sample. The image acquisition unit 24 includes, for example, a macro image acquisition device and a micro image acquisition device. The macro image acquisition device acquires a macro image of the slide glass G conveyed to the macro image acquisition position by the slide glass conveyance unit 23 using an imaging device for macro image acquisition. The macro image acquisition device sets an acquisition range (a scan range) of the micro image, a focus measurement position, and the like on the basis of the acquired macro image.

The micro image acquisition device acquires a micro image of the slide glass G conveyed to the micro image acquisition position by the slide glass conveyance unit 23, using an imaging device for micro image acquisition. The micro image acquisition device creates a focus map of the sample on the basis of the scan range and the focus measurement position set by the macro image acquisition device, using an objective lens with a high magnification of, for example, 40×, 80×, or 100×. The micro image acquisition device controls a height of the objective lens with respect to the sample on the basis of the created focus map, and acquires a micro image in the scan range using the imaging device for micro image acquisition. The image acquisition unit 24 outputs data of a macro image acquired by the macro image acquisition device, data of a micro image acquired by the micro image acquisition device, data such as a scan range and a focus map to the image processing unit 25.

A scanning scheme in the micro image device may be a strobe scanning scheme using an area image sensor or may be a line scanning scheme using a line scan sensor. Further, the scanning scheme may be a stop-and-go scheme in which movement, stop, and imaging of the slide glass are repeatedly performed in the scan range.

The image processing unit 25 is a unit that processes the image acquired by the image acquisition unit 24. The image processing unit 25 is configured of, for example, a computer system such as a Field-Programmable Gate Array (FPGA), an Applications Specific Integrated Circuit (ASIC), or a microcomputer. The image processing unit 25 combines the macro image data and the micro image data received from the image acquisition device 11 with each other to generate a virtual slide image of the sample. The image processing unit 25 associates the generated virtual slide image with the identification information of the cassette 41 received from the identification code reading unit 32, and stores the virtual slide image in the data server 14 together with data such as the scan range and the focus map via the control computer 12.

Subsequently, the cassette mounting detection unit 31 described above will be described in more detail.

Figure 6:
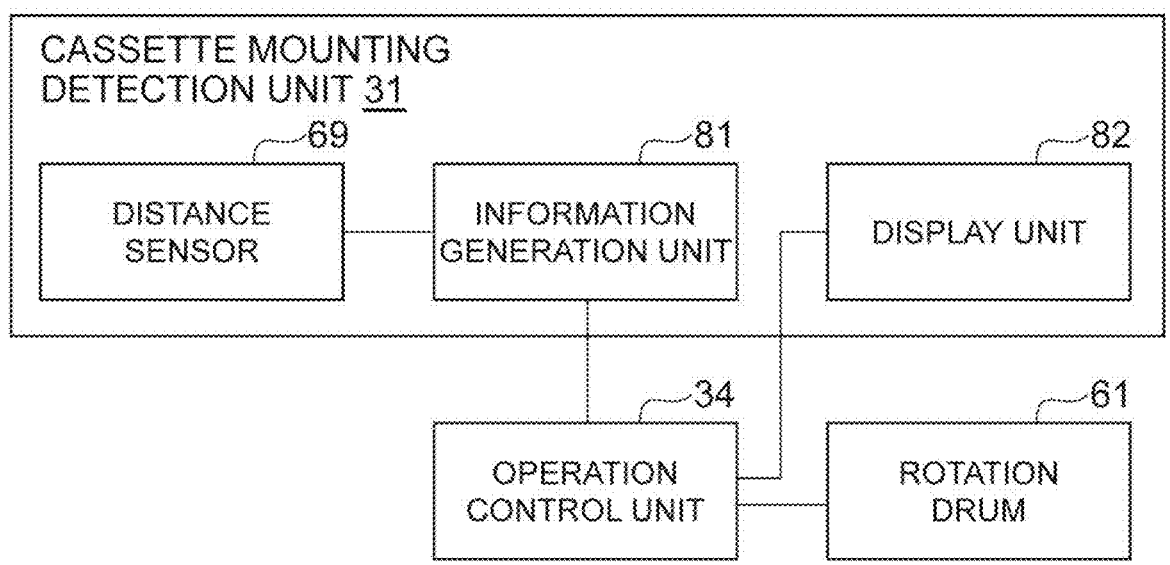
FIG. 6 is a block diagram illustrating an example of a cassette mounting detection unit.

FIG. 6 is a block diagram illustrating an example of the cassette mounting detection unit 31. As illustrated in FIG. 6, the cassette mounting detection unit 31 includes the distance sensor 69 described above, an information generation unit 81, and a display unit 82.

The distance sensor 69 is a sensor that measures a distance between distance sensor 69 and the cassette 41 mounted in the cassette mounting unit 21. The distance sensor 69 is, for example, an infrared reflective detection sensor including a distance measurement sensor (PSD: Position Sensitive Detector) and an infrared light source. This distance sensor 69 measures a distance from the distance measurement sensor to a measurement target on the basis of trigonometry, and outputs a detection signal based on a measurement result. It should be noted that the distance sensor 69 is not limited to a sensor using a triangular distance measurement scheme, and may be a sensor using another distance measurement scheme, such as a sensor using a time of flight scheme that measures a time until light from a light source is reflected by a measurement target and received and converts the time into a distance through arithmetic processing.

Figure 7:
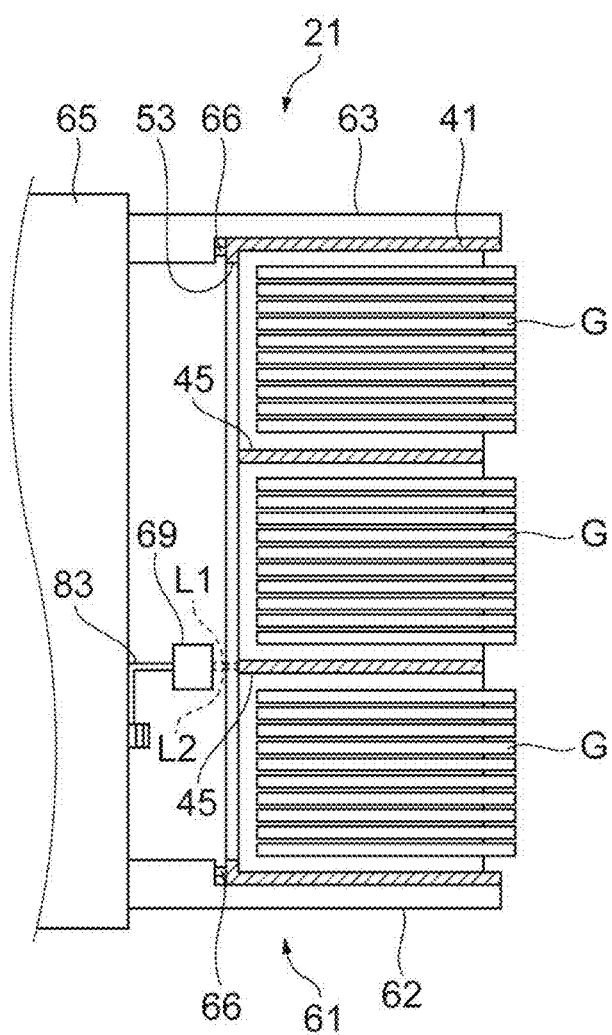
FIG. 7 is a schematic view illustrating a configuration of the cassette mounting detection unit.

In the embodiment, the distance sensor 69 is provided at three places on the circumferential surface or the side surface of the strut 65 so that the respective distance sensors 69 can be seen from three holding spaces S (see FIG. 5) accessible from the window of the frame K in the mounting position M1 through the insertion and removal opening 70A and the back opening 70B. The distance sensor 69 is fixed to the strut 65 via a support member 83 so that the distance sensor 69 has a height substantially matching a height of the partition plate 45 of the cassette 41 mounted in the cassette mounting unit 21 (here, the partition plate 45 on the lower end side), as illustrated in FIG. 7. The distance sensor 69 detects reflected light L2 of inspection light L1 emitted from the infrared light source and reflected by the partition plate 45 through the back opening 70B (see FIG. 5) of the cassette mounting unit 21 and the opening portion 53 of the cassette 41. The distance sensor 69 outputs a detection signal (for example, a voltage value or a current value) according to intensity of the detected reflected light L2 to the information generation unit 81.

The information generation unit 81 is a signal processing circuit that generates state information on a mounting state of the cassette 41 mounted in the cassette mounting unit 21. The information generation unit 81 is physically configured of, for example, a computer such as a microcomputer. The information generation unit 81 analyzes the detection signal received from the distance sensor 69, and detects the presence or absence of an abnormality in the mounting state of the cassette 41. When the information generation unit 81 determines, for example, that the cassette 41 is normally mounted as a result of the analysis of the detection signal, the information generation unit 81 generates state information indicating normal mounting. On the other hand, when the information generation unit 81 determines, for example, that the cassette 41 is being mounted as a result of the analysis of the detection signal, the information generation unit 81 generates state information indicating that the cassette 41 is being mounted. The information generation unit 81 outputs the generated state information to the operation control unit 34.

The operation control unit 34 controls the operation of the rotation drum 61 on the basis of the state information received from the information generation unit 81. When the operation control unit 34 receives the state information indicating that the mounting state of the cassette 41 is normal from the information generation unit 81, the operation control unit 34 allows the rotation of the rotation drum 61. In this case, the cassette 41 mounted in the cassette mounting unit 21 is sent from the mounting position M1 to an inspection position and the removal position in response to an operation of the user, or the like. On the other hand, when the operation control unit 34 receives the state information indicating that the mounting state of the cassette 41 is abnormal from the information generation unit 81, the operation control unit 34 prohibits the rotation of the rotation drum 61. In this case, the rotation of the rotation drum 61 is not performed until the cassette 41 is normally mounted again.

Further, the operation control unit 34 controls the display unit 82 on the basis of the state information received from the information generation unit 81. For example, as illustrated in FIG. 5, the display unit 82 is provided above the window of the frame K in the cassette mounting unit 21, that is, above the mounting position M1 of the cassette 41. The display unit 82 includes, for example, a plurality of lamps corresponding to the respective holding spaces S. In the example of FIG. 5, a total of 12 holding spaces S are provided in the rotation drum 61, and three holding spaces S can be accessed from the window of the frame K in the mounting position M1. Corresponding thereto, a line of three lamps is arranged in each of four stages in the display unit 82.

A method of displaying the state information in the display unit 82 is not particularly limited. The operation control unit 34 may cause each lamp of the display unit 82 to blink, for example, when the operation control unit 34 has received the state information indicating that the cassette 41 is being mounted from the information generation unit 81. Further, the operation control unit 34 may light each lamp of the display unit 82, for example, when the operation control unit 34 has received the state information indicating the normal mounting of the cassette 41 from the information generation unit 81. Furthermore, the operation control unit 34 may display the state information, for example, through lighting and extinguishing of each lamp, or may display the state information using a lighting color of each lamp.

Next, an operation of the image acquisition device 11 will be described.

Figure 8:
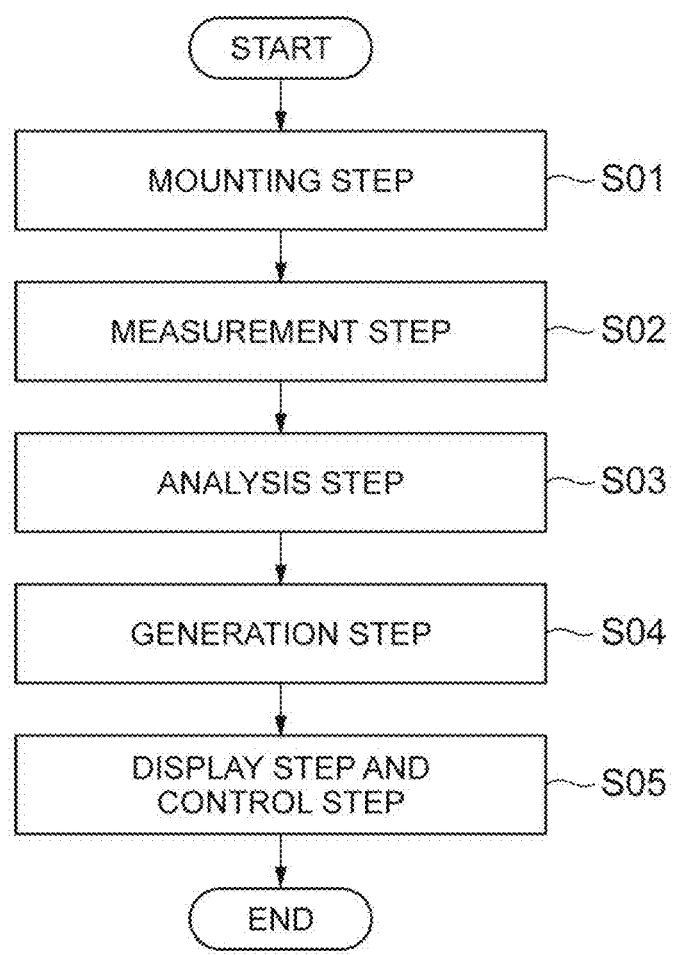
FIG. 8 is a flowchart illustrating an example of an operation of the image acquisition device.

FIG. 8 is a flowchart illustrating an example of the operation of the image acquisition device 11. As illustrated in FIG. 8, in the image acquisition device 11, a series of processes for detecting the mounting state of the cassette 41 in the cassette mounting unit 21 are executed by the cassette mounting detection unit 31 prior to acquisition of a virtual slide image of the sample. In this process, first, the cassette 41 is mounted in the cassette mounting unit 21 (step S01: mounting step). In step S01, the cassette 41 is inserted from the insertion and removal opening 70A toward the holding space S between the cassette holding plates 64 and 64, and the metal plate 54 on the back surface of the cassette 41 is coupled to the magnet 66 on the cassette mounting unit 21 side.

After the cassette 41 is mounted, the distance sensor 69 measures a distance to the cassette 41 held in the holding space S in the mounting position M1 (step S02: measurement step). In this step S02, the distance sensor 69 measures a distance to the partition plate 45 of the cassette 41 through the back opening 70B of the cassette mounting unit 21 and the opening portion 53 of the cassette 41. Then, the information generation unit 81 analyzes the detection signal output from the distance sensor 69 to detect the mounting state of the cassette 41 (step S03: analysis step). The information generation unit 81 generates state information on the mounting state of the cassette 41 (step S04: analysis step). In step S04, when the information generation unit 81 determines that the cassette 41 is being mounted, the information generation unit 81 generates state information indicating that the cassette 41 is being mounted. When the information generation unit 81 determines that the cassette 41 has been normally mounted, the information generation unit 81 generates state information indicating normal mounting.

When the state information is generated, a display of the state information on the display unit 82 and control of the rotation drum 61 are performed on the basis of the state information (step S05: display step and control step). In step S05, the operation control unit 34 controls lighting and extinguishing of each lamp of the display unit 82, and reports the holding state of the cassette 41 held in each holding space S to the outside. For example, when the information generation unit 81 generates state information indicating that the cassette 41 is being mounted, the operation control unit 34 causes each lamp of the display unit 82 to blink. Further, for example, when the information generation unit 81 generates the state information indicating normal mounting of the cassette 41, the operation control unit 34 lights each lamp of the display unit 82. Further, in step S05, when the mounting state of the cassette 41 is normal, the rotation of the rotation drum 61 is allowed, and when the mounting state of the cassette 41 is abnormal, the rotation of the rotation drum 61 is prohibited. It should be noted that in step S05, only one of the display step and the control step may be executed.

Hereinafter, a detection example of the mounting state of the cassette 41 in the cassette mounting detection unit 31 will be described.

Figure 9:
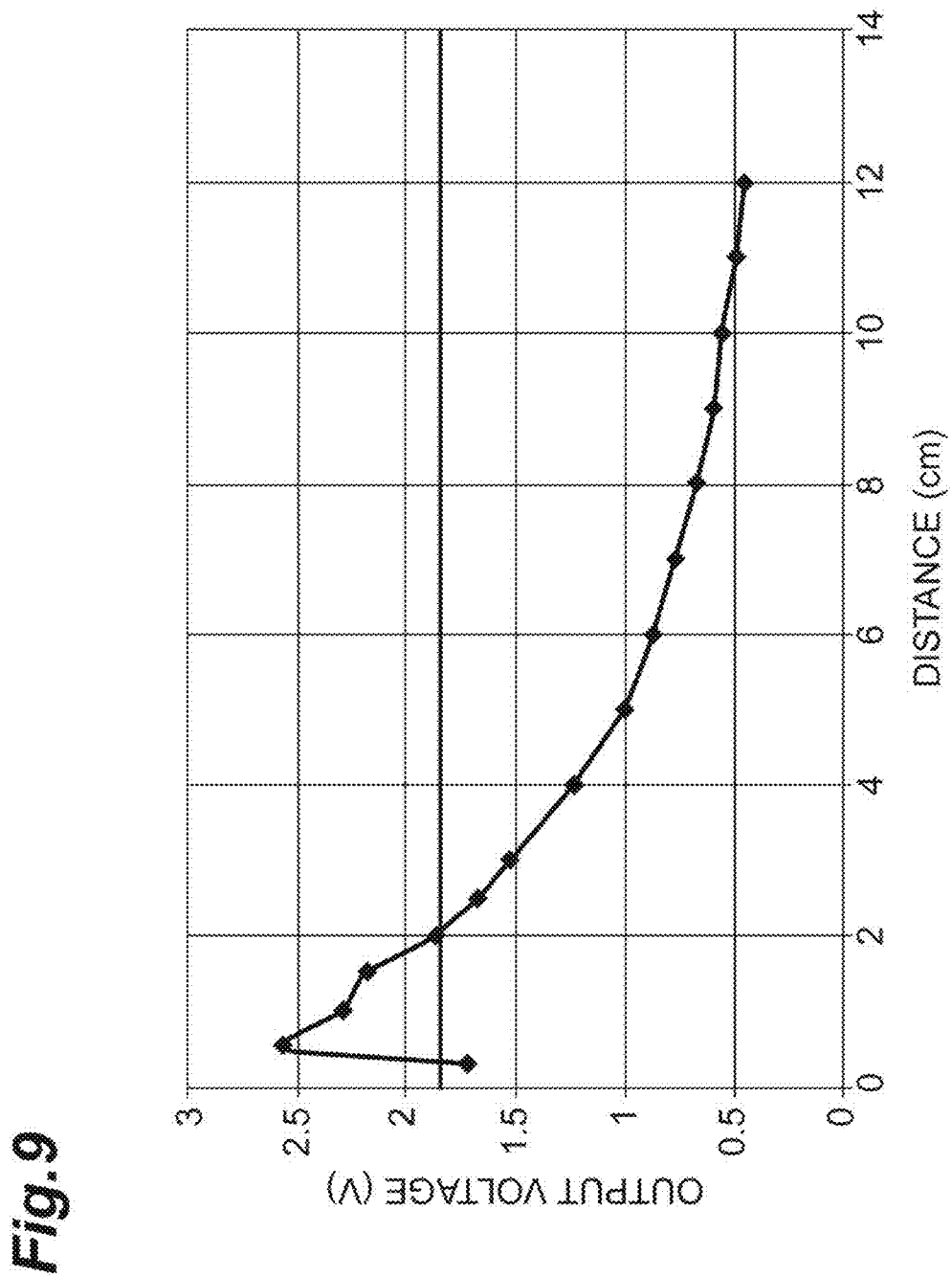
FIG. 9 is a diagram illustrating an analysis example of a detection signal from a distance sensor.

FIG. 9 is a diagram illustrating an analysis example of the detection signal from the distance sensor. In FIG. 9, output characteristics of the detection signal of the distance sensor 69 are illustrated, and a horizontal axis indicates a distance from the distance sensor 69 to a measurement target, and a vertical axis indicates an output voltage. In this example, a measurement range of the distance sensor 69 is, for example, from about 1 cm to about 15 cm. In this range, a value of a voltage output from the distance sensor 69 decreases as the distance to the measurement target increases.

For example, when a distance between the distance sensor 69 and the cassette 41 is 5 cm or less, the information generation unit 81 determines that the cassette 41 is being mounted in the holding space S of the cassette mounting unit 21. In this case, a threshold (a first threshold) of the output voltage from the distance sensor 69 is set to, for example, 1 V. When the output voltage from the distance sensor 69 is equal to or higher than 1 V, the information generation unit 81 generates state information indicating that the cassette 41 is being mounted.

Further, for example, when the distance between the distance sensor 69 and the cassette 41 is 2 cm or less, the information generation unit 81 determines that the cassette 41 is normally mounted in the holding space S of the cassette mounting unit 21. In this case, a threshold (a second threshold) of the output voltage from the distance sensor 69 is set to, for example, 1.8 V. When the output voltage from the distance sensor 69 becomes 1.8 V or more, the information generation unit 81 generates state information indicating normal mounting. When the output voltage from the distance sensor 69 becomes equal to or more than the first threshold and less than the second threshold, that is, is equal to or higher than 1 V and lower than 1.8 V, the information generation unit 81 generates state information indicating that the cassette 41 is being mounted and/or abnormal mounting (for example, insufficient insertion).

As described above, the image acquisition device 11 measures the distance to the cassette 41 mounted in the cassette mounting unit 21 using the distance sensor 69. When the cassette 41 is not normally mounted in the cassette mounting unit 21, a measurement result of the distance to the cassette 41 in the distance sensor 69 fluctuates with respect to a normal value. Therefore, it is possible to generate state information on the mounting state of the cassette 41 by analyzing the detection signal from the distance sensor 69. By ascertaining the state information in advance, it is possible to prevent the image acquisition from being executed in a state in which the cassette 41 is not correctly mounted, and to prevent failure of the device in advance.

Further, in the image acquisition device 11, the cassette mounting unit 21 includes the insertion and removal opening 70A into or from which the cassette 41 is inserted or removed, and the back opening 70B located on the side opposite to the insertion and removal opening 70A. The distance sensor 69 is a reflective distance sensor that measures the distance to a back surface portion of the cassette 41 through the back opening 70B. With such a configuration, the cassette 41 can be easily mounted from the insertion and removal opening 70A, and the distance measurement using the distance sensor 69 can be performed via the back opening 70B. Therefore, the mounting of the cassette 41 and the detection of the mounting state can be realized with a simple configuration.

Further, in the image acquisition device 11, the cassette 41 includes the partition plate 45 that partitions the slide glasses G in the arrangement direction, and the distance sensor 69 measures a distance to the partition plate 45. Accordingly, detection of the mounting state of the cassette 41 can be accurately performed.

Further, in the image acquisition device 11, the cassette mounting unit 21 includes the rotation drum 61 having a plurality of holding spaces S for the cassette 41 radially, and the operation control unit 34 controls the operation of the rotation drum 61 on the basis of the state information generated by the information generation unit 81. By controlling the operation of the rotation drum 61 as described above, it is possible to more reliably prevent image acquisition from being executed in a state in which the cassette 41 is not correctly attached.

Further, in the image acquisition device 11, the strut 65 through which the rotation drum 61 is inserted is provided in the cassette mounting unit 21, and the distance sensor 69 is provided on the circumferential surface or the side surface of the strut 65. Therefore, the distance sensor 69 can be used in common for different cassettes 41 held in the rotation drum 61. Since it is not necessary to provide the distance sensor 69 for each cassette 41, reduction of manufacturing costs of the cassette 41 can be achieved.

Further, in the embodiment, the metal plate 54 is provided on the back surface of the cassette 41, and the magnet 66 to be coupled to the metal plate 54 is provided in the cassette mounting unit 21. Accordingly, the cassette 41 can be mounted in the cassette mounting unit 21 with a simple configuration. The magnet 66 is provided on the bottom plate 62 and the top plate 63 of the rotation drum 61, and the cassette 41 is vertically coupled by the magnet 66. Thus, stability of mounting can be ensured.

Further, in the image acquisition device 11, the display unit 82 that displays the mounting state of the cassette 41 on the basis of the state information generated by the information generation unit 81 is provided. Accordingly, a user of the image acquisition device 11 can immediately ascertain the mounting state of the cassette 41 through reporting from the display unit 82.

The present disclosure is not limited to the above embodiment. For example, in the embodiment, a height of the distance sensor 69 is aligned with a height of the partition plate 45 on the lower end side as illustrated in FIG. 7, but the height of the distance sensor 69 may be aligned with the height of the partition plate 45 on the upper end side. Further, the distance sensor 69 may not be necessarily aligned with the height of the partition plate 45, and any position in a wall portion on the back surface side of the cassette 41 may be irradiated with the inspection light L1 emitted from the distance sensor 69.

Further, although three distance sensors 69 are disposed for the respective cassettes 41 held in the three holding spaces S located in the mounting position M1 of the rotation drum 61 in the above embodiment, the distance sensor 69 may be disposed for the cassette 41 located in the removal position in which the slide glass G in the cassette 41 is taken out by the slide glass removal unit 22. By detecting the mounting state of the cassette 41 in the removal position, it is possible to prevent removal of the slide glass G from being executed in a state in which the cassette 41 is not correctly mounted, and to prevent failure of the conveyance hand or the like.

REFERENCE SIGNS LIST

11: Image acquisition device
21: Cassette mounting unit
34: Operation control unit
41: Cassette
45: Partition plate
54: Metal plate (metal member)
61: Rotating drum
65: Strut
66: Magnet
69: Distance sensor
70A: Insertion and removal opening
70B: Back opening
81: Information generation unit
82: Display unit
83: Support member
G: Slide glass
S: Holding space

The invention claimed is:

1. A device comprising:
a cassette mounting unit configured to be detachably mounted with a cassette, the cassette holding slide glasses in a plurality of stages in a predetermined arrangement direction;
a distance sensor configured to measure a distance to the cassette mounted in the cassette mounting unit and to output a detection signal based on a measurement result; and
an information generator configured to generate state information on a mounting state of the cassette mounted in the cassette mounting unit on the basis of the detection signal,
wherein the cassette mounting unit includes a rotation drum having a plurality of holding spaces for the cassettes radially, and
the device further comprises an operation controller to control an operation of the rotation drum on the basis of the state information generated by the information generator,
wherein the cassette mounting unit includes a strut through which the rotation drum is inserted, and
the distance sensor is provided in the strut via a support member.

2. The device according to claim 1,
wherein the cassette mounting unit includes an insertion and removal opening into or from which the cassette is inserted or removed, and a back opening located on a side opposite to the insertion and removal opening, and
the distance sensor is a reflective distance sensor configured to measure a distance to a back surface portion of the cassette through the back opening.

3. The device according to claim 1,
wherein the cassette includes a partition plate configured to partition the slide glasses in the arrangement direction, and
the distance sensor measures a distance to the partition plate.

4. The device according to claim 1,
wherein a metal member is provided on a back surface of the cassette, and
the cassette mounting unit includes a magnet to be coupled to the metal member.

5. The device according to claim 1, further comprising:
a display unit that displays the mounting state of the cassette on the basis of the state information generated by the information generation unit.

6. A method comprising:
mounting a cassette in a cassette mounting unit, the cassette holding slide glasses in a plurality of stages in a predetermined arrangement direction;
measuring a distance to the cassette mounted in the cassette mounting unit using a distance sensor, and
generating state information on a mounting state of the cassette mounted in the cassette mounting unit on the basis of a detection signal from the distance sensor,
wherein the cassette mounting unit includes a rotation drum having a plurality of holding spaces for the cassettes radially, and
the method further comprises controlling an operation of the rotation drum on the basis of the state information, and wherein the cassette mounting unit includes a strut through which the rotation drum is inserted, and the distance sensor is provided in the strut via a support member.

7. The method according to claim 6, wherein the cassette mounting unit includes an insertion and removal opening into or from which the cassette is inserted or removed, and a back opening located on the side opposite to the insertion and removal opening, and the measurement includes measuring a distance to a back surface portion of the cassette through the back opening using the distance sensor.

8. The method according to claim 6, wherein the cassette includes a partition plate configured to partition the slide glasses in the arrangement direction, and the measurement includes measuring a distance to the partition plate using the distance sensor.

9. The method according to claim 6, further comprising:

displaying the mounting state of the cassette on the basis of the state information.

\* \* \* \* \*